Patented June 11, 1940

2,204,113

UNITED STATES PATENT OFFICE 2,204,113

CALCIUM SILICATE AND METHOD OF PREPARING THE SAME

Raymond P. Allen, Akron, Ohio, assignor to The B. F. Goodrich Company, New York, N. Y., a corporation of New York No Drawing. Application September 30, 1937, Serial No. 166,698

7 Claims. (Cl. 23—110)

This invention relates to a method of making hydrous calcium silicate, and has as its object to provide a finely divided, easily friable, pure product.

In the preparation of calcium silicate from a water-soluble silicate and a water-soluble calcium salt, many difficulties have been encountered. When sodium silicate and calcium chloride, for instance, are reacted in water solution in such a manner that the concentration of reactants varies appreciably throughout the solution, there is a tendency to precipitate large amounts of sodium chloride with the calcium silicate thereby forming a grainy impure product. Furthermore, it is very difficult to obtain pure calcium silicate from this impure product because the sodium chloride is precipitated with the calcium silicate in such a way that ordinary washing methods are insufficient to remove the salt. A pure, smooth, finely-divided precipitate may be obtained by using less concentrated reactants, but when the product is filtered, the cake dries to a hard, difficultly friable mass. Largely because of these difficulties, calcium silicate, although it imparts desirable properties to rubber when compounded therewith, has never found wide commercial use as a pigment in the rubber industry or otherwise.

I have discovered that by reacting a soluble silicate and a calcium halide in an aqueous medium in which high local concentrations of either of the reactants are prevented, I am able to precipitate pure, finely-divided calcium silicate which may be filtered and dried to produce an easily friable, chalky cake. To maintain as uniform a concentration as possible of reactants throughout the reaction medium, I simultaneously introduce aqueous solutions of silicates and calcium halides into a reaction vessel, and I provide the reaction vessel with a stirring means which will rapidly mix the reactants. By this method of maintaining a uniform concentration of reactants, I am able to produce calcium silicate of uniformly small particle size. While ordinary methods of precipitation produce calcium silicate whose particle size may be as great as 30 microns, the diameter of most of the particles produced by the method of my invention is about 0.3 micron.

The product which I obtain is one which, to my knowledge, has never before been prepared. A typical analysis shows $SiO_2$ 62.0%, $CaO$ 19.5%, and $H_2O$ 18.5%. The product, therefore, has a molal ratio of 1 mol of $CaO$ to 3 mols of $SiO_2$. Its formula is probably $CaO.3SiO_2.3H_2O$, though some of the product may exist as $Ca(OH)_2.3SiO_2.2H_2O$.

In the practice of my invention, the reactants are preferably added to the reaction mixture slowly and simultaneously. One very satisfactory method is to introduce one reactant at the top and the other reactant near the bottom of the reaction vessel. The rate of addition may be varied over wide limits, different rates being preferable for best results with different concentrations of reactants. Since it is necessary to minimize high local concentrations of either reactant, the stirring must be very thorough. Propeller-type blades have a tendency merely to cut through the slurry without stirring it, so I prefer to use a paddle-type stirrer comprising a central shaft having a series of radially extending blades, the plane of each blade being coaxial with the shaft. The reaction vessel may be heated if desired, but it is an advantage of my invention that it is unnecessary to heat the reaction mixture to obtain satisfactory products.

The soluble silicate employed in the reaction may be either a commercial or technical grade of sodium or potassium silicate in concentrated or dilute aqueous solution. When I employ sodium silicate, which is cheaper and more readily available, I prefer to use a product in which the molal ratio of $SiO_2$ to $Na_2O$ is at least 3:1. The calcium salt is always supplied to the reaction mixture in the form of a water solution.

In the preferred method of practicing my invention, I use a reaction vessel fitted with a suitable stirring device and containing openings at the top and bottom for the admission of water glass and calcium chloride solution respectively. When using a 110 gallon tank, I put 39 gals. of water therein. I use as reactants calcium chloride which contains on the average 21.2% of water and water glass which has a specific gravity of about 1.40 gms./c. c., a molal ratio of $SiO_2$ to $Na_2O$ of about 3.25:1, and contains on the average 61.3% of water. I dissolve 36 lbs. of the calcium chloride in water to make 15 gals. and dilute 11 gals. of water glass with water to make 40 gals. I slowly and continuously add the solutions to the reaction vessel, the time consumed in the addition being about 25 minutes. The aqueous slurry, which has been thoroughly stirred while the reactants were being added, is then diluted with twice its volume of water and filtered on an Oliver filter running at about ⅓ R. P. M. The cake is washed on the filter with a slow trickle of water, removed from the filter, and dried. The product is an easily friable, chalky cake which is easily ground fine enough to pass a 100 mesh screen. Its specific gravity is 2.1.

The calcium silicate prepared by the method of my invention is an extremely useful pigment, finding application in the rubber, plastics, cement, paint, and petroleum industries. It is easily incorporated in rubber compositions wherein it produces a marked improvement in the tear resistant properties. Rubber stocks containing calcium silicate cure in a markedly shorter time than corresponding stocks containing no calcium silicate. It is also a good activator when used in a rubber composition containing a basic accelerator. Its extremely small particle size makes it useful for the decolorization of numerous liquids, such as animal, vegetable, and mineral oils. It may also be employed as a selective absorbent for the treatment of gas mixtures. The inexpensive, simple method of preparation and the uniformity of the products make it acceptable in many other industrial applications.

Although I have herein disclosed a specific embodiment of my invention, I do not intend to limit myself wholly thereto, for it will be obvious to those skilled in the art that numerous modifications such as variations in the amount, type, or character of the reactants, variations in the concentration of the reactants, and variation in the rate at which the reactants are introduced into the reacting vessel are within the spirit and scope of the appended claims.

I claim:

1. In a process of producing finely-divided, easily friable calcium silicate, the step of simultaneously instilling, with stirring, separate aqueous solutions of a calcium halide and of a soluble silicate into different locations in a reaction vessel.

2. In a process of producing finely-divided, easily friable calcium silicate, the step of simultaneously instilling, with stirring, separate aqueous solutions of calcium chloride and of sodium silicate having a molal ratio of silicon dioxide to sodium oxide of at least three to one into different locations in a reaction vessel.

3. In a process of producing finely-divided, easily friable calcium silicate, the steps of simultaneously instilling, with stirring, separate aqueous solutions of calcium chloride and of sodium silicate into different locations in a reaction vessel, separating the precipitate from the aqueous medium, washing said precipitate, and removing the free moisture from the precipitate.

4. In a process of producing finely-divided, easily friable calcium silicate, the step of simultaneously introducing, with stirring, an aqueous calcium halide and a soluble silicate into different locations in a reaction vessel initially containing an aqueous precipitation medium.

5. Easily friable precipitated calcium silicate, most of the particles of which have an ultimate size of about 0.3 micron.

6. The process of precipitating finely divided calcium silicate which comprises introducing solutions of calcium chloride and of sodium silicate into a unitary body of aqueous liquid in such a manner as to distribute each reagent through a large volume of the unitary body of aqueous liquid before it is brought into reacting contact with the other reagent.

7. The process of precipitating finely divided calcium silicate which comprises introducing dilute solutions of calcium chloride and of sodium silicate into different portions of a unitary agitated body of aqueous reaction liquid, whereby each reagent is distributed through a large volume of the liquid before it is brought into reacting contact with the other reagent.

RAYMOND P. ALLEN.